United States Patent
Daniels et al.

(10) Patent No.: US 10,421,499 B2
(45) Date of Patent: Sep. 24, 2019

(54) TWO PIECE, TWO COLOR COMPONENT AND METHOD FOR MANUFACTURING THE SAME

(71) Applicant: REHAU Automotive, LLC, Novi, MI (US)

(72) Inventors: Chad Edward Daniels, Canton, MI (US); Ioan Hefin Jones, Cullman, AL (US); Benjamin Wayne Munson, Hartselle, AL (US); Christian Herbert Peter Hauser, Peachtree City, GA (US); Lucien William Barksdale, Jr., Cullman, AL (US); Thomas J. Mett, Doehlau (DE); Mark Francis Murphy, Cullman, AL (US); Vikas Grover, Hoover, AL (US)

(73) Assignee: REHAU AUTOMOTIVE, LLC, Novi, MI (US)

( * ) Notice: Subject to any disclaimer, the term of this patent is extended or adjusted under 35 U.S.C. 154(b) by 0 days.

(21) Appl. No.: 15/371,954

(22) Filed: Dec. 7, 2016

(65) Prior Publication Data

US 2017/0158249 A1     Jun. 8, 2017

Related U.S. Application Data

(60) Provisional application No. 62/264,103, filed on Dec. 7, 2015.

(51) Int. Cl.
*B62D 25/18* (2006.01)
*B29C 69/00* (2006.01)
(Continued)

(52) U.S. Cl.
CPC .............. *B62D 25/18* (2013.01); *B29C 65/08* (2013.01); *B29C 65/606* (2013.01); *B29C 69/00* (2013.01);
(Continued)

(58) Field of Classification Search
CPC ...... B62D 25/18; B62D 25/16; B62D 25/161; B62D 25/163; B62D 25/165;
(Continued)

(56) References Cited

U.S. PATENT DOCUMENTS 2,059,305 A * 11/1936 Best ..................... B62D 25/182
                                                      280/153.5
4,227,718 A * 10/1980 Durben ................ B62D 25/161
                                                      280/770

(Continued)

*Primary Examiner* — James M Dolak
(74) *Attorney, Agent, or Firm* — Fitch, Even, Tabin & Flannery LLP

(57) ABSTRACT

An automotive splash guard includes first and second molded pieces. The first molded piece has a shape configured to have at least a portion thereof installed outside an automobile wheel well, and the second molded piece has a shape configured to be installed in an automobile wheel well. The first piece has an exterior painted surface, the first piece is separate from the second piece while the first piece is being painted and is attached to the second piece after being painted by mechanical joining or adhering. A method for manufacturing a splash guard includes molding the first piece; molding the second piece; painting the first piece while it is separate from the second piece; and then attaching the second piece to the first piece.

9 Claims, 6 Drawing Sheets

(51) Int. Cl.
*B29C 65/08* (2006.01)
*B29C 65/60* (2006.01)
*B29L 31/30* (2006.01)
*B29K 23/00* (2006.01)

(52) U.S. Cl.
CPC ..... *B29K 2023/12* (2013.01); *B29L 2031/302* (2013.01)

(58) Field of Classification Search
CPC .. B62D 25/168; B62D 25/182; B62D 25/184; B62D 25/186; B62D 25/188; B29C 65/08; B29C 65/606; B29C 69/00
See application file for complete search history.

(56) References Cited

U.S. PATENT DOCUMENTS

| | | | | |
|---|---|---|---|---|
| 4,378,120 | A * | 3/1983 | Laine | B62D 25/161 24/331 |
| 4,447,067 | A * | 5/1984 | Yamashita | B62D 25/161 280/848 |
| 4,927,177 | A * | 5/1990 | Price | B62D 25/18 280/851 |
| 5,108,129 | A * | 4/1992 | Olsen | B62D 25/161 280/850 |
| 5,375,882 | A * | 12/1994 | Koch, III | B62D 25/188 280/848 |
| 5,407,229 | A * | 4/1995 | Garrett | B62D 25/18 280/851 |
| 5,613,710 | A * | 3/1997 | Waner | B62D 25/161 280/848 |
| 6,013,351 | A * | 1/2000 | Mahn, Jr. | B32B 27/06 156/230 |
| 6,193,278 | B1 * | 2/2001 | Ward | B62D 25/18 280/848 |
| 7,488,032 | B2 * | 2/2009 | Thakar | B62D 25/161 296/191 |
| 7,914,046 | B2 * | 3/2011 | Iverson | B62D 25/18 172/508 |
| 9,022,428 | B2 * | 5/2015 | Balasundaramohan | B62D 25/18 280/848 |
| 9,278,716 | B1 * | 3/2016 | Joseph | B62D 25/18 |
| 9,862,426 | B2 * | 1/2018 | Iordanou | B05B 12/20 |
| 9,873,461 | B2 * | 1/2018 | Chai | B62D 25/161 |
| 10,011,307 | B2 * | 7/2018 | Dyck | B62D 25/18 |
| 10,093,361 | B2 * | 10/2018 | Wilson | B62D 25/182 |
| 10,207,743 | B2 * | 2/2019 | Schneider | B23K 26/244 |

* cited by examiner

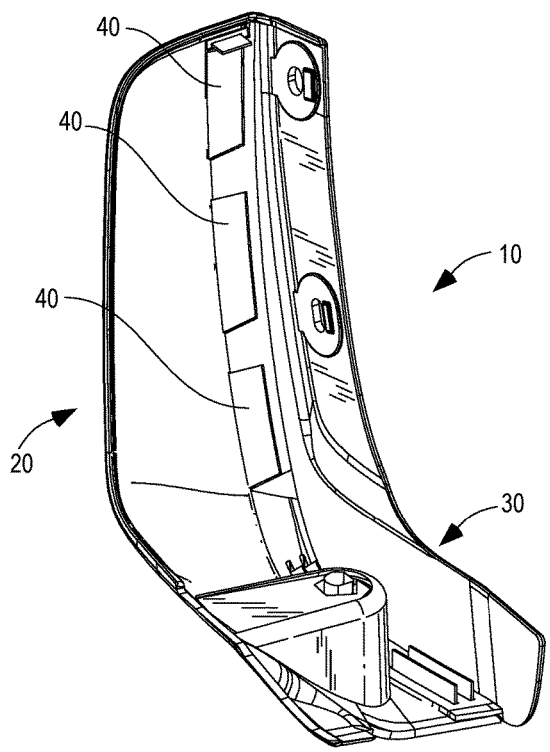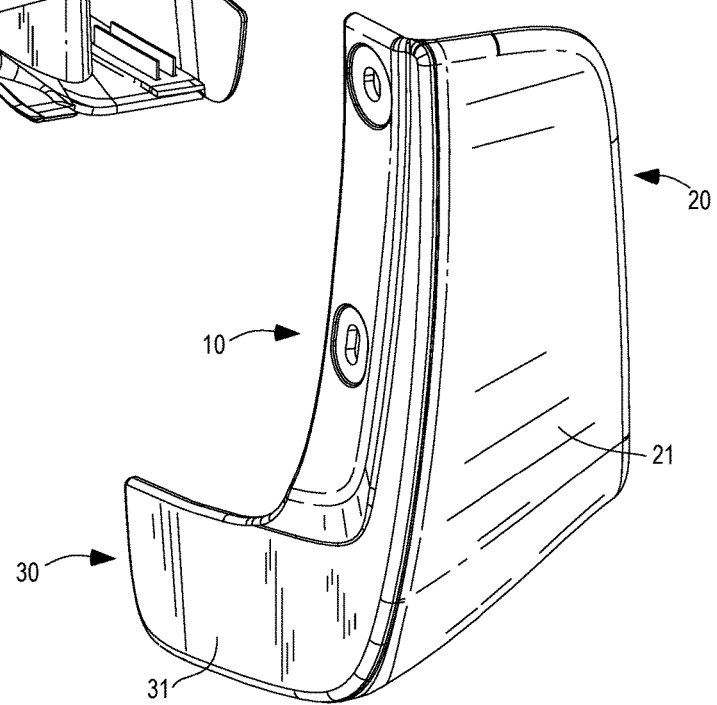

TWO PIECE, TWO COLOR COMPONENT AND METHOD FOR MANUFACTURING THE SAME

FIELD OF THE INVENTION

This invention relates to a method for manufacturing two tone component, such as an automotive partially painted splash guard, and to such a two piece, two color component.

BACKGROUND OF THE INVENTION

Automotive original equipment manufacturers (OEMs) are continually increasing the level of visual standards in line with customer expectations for both styling and quality. This philosophy has filtered down onto the previously non-visually critical lower body parts of the vehicle. Typical examples are the splash guards (or mud flaps or mud guards) designed to protect the vehicle from road dirt, flying debris and grime thrown up from the rotating tire. In this specification, applicant uses the phrase splash guard synonymously with mud flaps or mud guards.

Modern standards for these components dictate that the visible exterior sections of the part must be painted in vehicle body color while the less visible area inside the wheel well should be natural black material colored to avoid contrast with the surrounding black components. The transition between body color and black must be clean and defined.

The traditional manufacturing process for two-tone painted parts requires a cumbersome and wasteful masking process. In order to produce the level of quality required by automotive manufacturers, this process usually involves a hand applied self-adhesive masking which can be removed once the painting process is complete. This leaves a clear and defined line between the painted and non-painted section of the components.

Applicant has found that the downsides of this process are high labor costs or high investments into automated masking equipment, high costs from the masking materials themselves and increased scrap from the painting process.

SUMMARY OF THE INVENTION

The present invention relates to a method for manufacturing two tone component, such as an automotive partially painted splash guard, and to such a two piece, two color component.

In one embodiment of the invention, the component is a splash guard that includes first and second molded pieces. The first molded piece has a shape configured to have at least a portion thereof installed outside an automobile wheel well, and the second molded piece has a shape configured to be installed in an automobile wheel well. The first piece has an exterior painted surface, the first piece is separate from the second piece while the first piece is being painted and is attached to the second piece after being painted by mechanical joining or adhering.

In one embodiment of the method of the invention, method can be used for manufacturing a splash guard and includes molding a first piece having a shape configured to have at least a portion thereof installed outside an automobile wheel well; molding a second piece having a shape configured to be installed in an automobile wheel well and configured to be attached to the first piece; painting the first piece while it is separate from the second piece; and then attaching the second piece to the first piece.

BRIEF DESCRIPTION OF THE DRAWINGS

An improved understanding of the key features of the invention can be seen in the drawings in which:

FIG. 2 is an inner perspective view showing an embodiment of the present invention in a fully assembled state;

FIG. 3 is an outer perspective view showing the embodiment of the present invention of FIG. 2 in the fully assembled state from a different perspective;

DETAILED DESCRIPTION OF THE INVENTION

Figure 1:
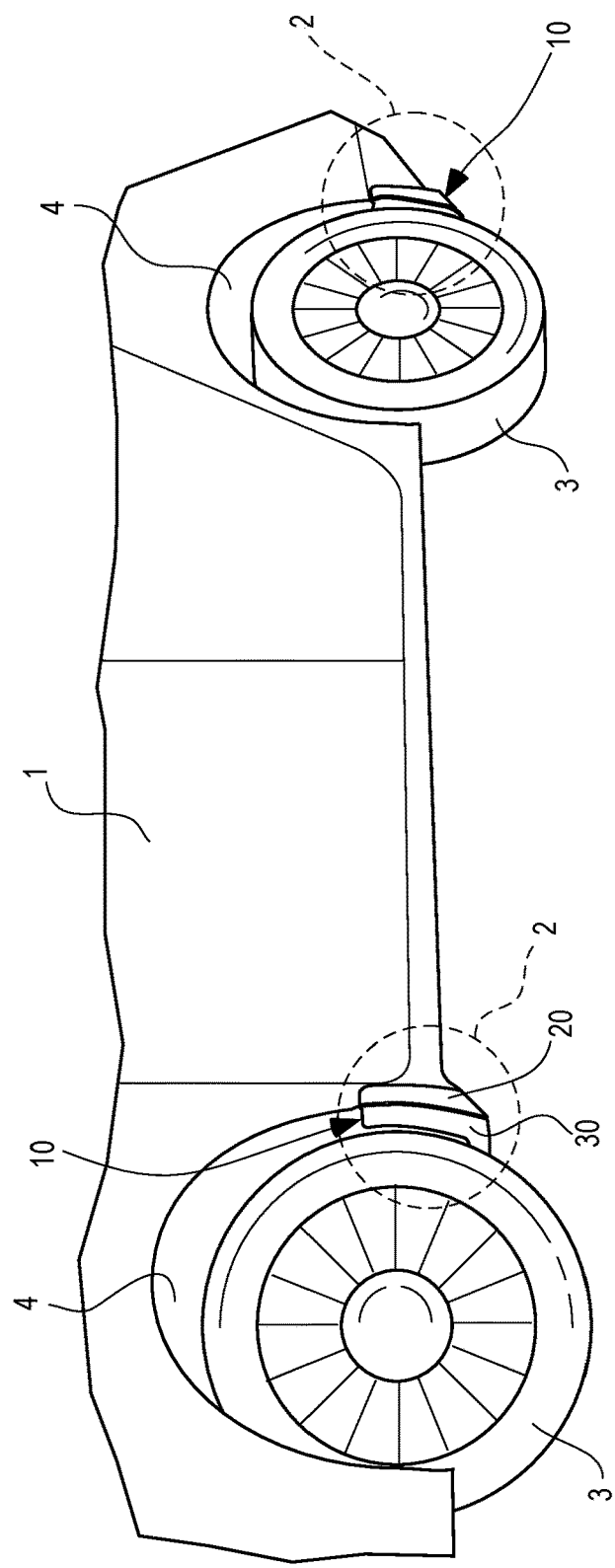
FIG. 1 is a schematic view showing an embodiment of the present invention installed on an automotive vehicle body.

FIG. 1 is a schematic view showing an embodiment of the present invention installed on an automotive vehicle body. In this embodiment, the component is a splashguard 10 installed on a vehicle body 1 in areas marked by dotted line circles 2.

As is known in the art, splash guards 10 (or mud flaps or mud guards) are installed on and designed to protect the vehicle body 1 from road dirt, flying debris and grime thrown up from the rotating tires 3. As noted above, modern standards for these components dictate that the visible exterior sections 20 of the splash guards must be painted in color of the exterior of the vehicle body 1 while the less visible sections 30 inside the wheel wells 4 would typically be natural black material colored to avoid contrast with the surrounding black components. The transition between body color and black is desired to be clean and defined. The present invention provides a method for manufacturing two tone component, and to such a two piece, two color component that can be used a splash guard for an automotive (e.g., car or truck) vehicle body.

FIG. 2 is an inner perspective view showing an embodiment of splash guard 10 of the present invention in a fully assembled state, and FIG. 3 is an outer perspective view (i.e., as seen from the exterior of the vehicle after its installation) showing the embodiment of splash guard 10 of the present invention in the fully assembled state but from a different perspective than that of FIG. 2. As shown in FIGS. 2 and 3, the splash guard 10 includes a first molded piece 20 having a shape configured to have at least a portion thereof installed outside an automobile wheel well, and a second molded piece 30 having a shape configured to be installed in an automobile wheel well. At least the visible exterior surfaces 21 of the first piece molded piece 20 of the splash guard 10 is painted in the color of the exterior of the vehicle body. It is possible to paint all of the first piece molded piece 20 or only the visible exterior surfaces 21. The second molded piece 30, having a shape configured to be installed in an automobile wheel well, may be made of a material having a black color. Thus, the second molded piece 30, which is installed in the wheel well may be a natural black material such that the visible surface 31 (visible in the wheel well) is colored to avoid contrast with the surrounding black components of the wheel well. In the assembled state shown in FIGS. 2 and 3, the main portion of the visible exterior surfaces 21 of the first piece 20 extends at an angle, e.g., orthogonally, from the visible surface 31 of the second piece 30.

However, it is not required that the second molded piece 30, which is installed in the wheel, be a natural black material. In fact, while the second molded piece 30 might typically be molded black, it could also be painted or molded in any other color as desired, e.g., by the OEM.

The first and second molded pieces 20, 30 of the splash guard 10 may be molded, e.g., by injection molding, from any material that may be used for automotive splash guards, e.g., a paintable grade polymer material, for example, polypropylene. Preferably the two pieces 20, 30 are molded separately and independently, allowing for the two pieces 20, 30 to be molded from different polymer materials or polymer materials of different colors.

Figure 4:
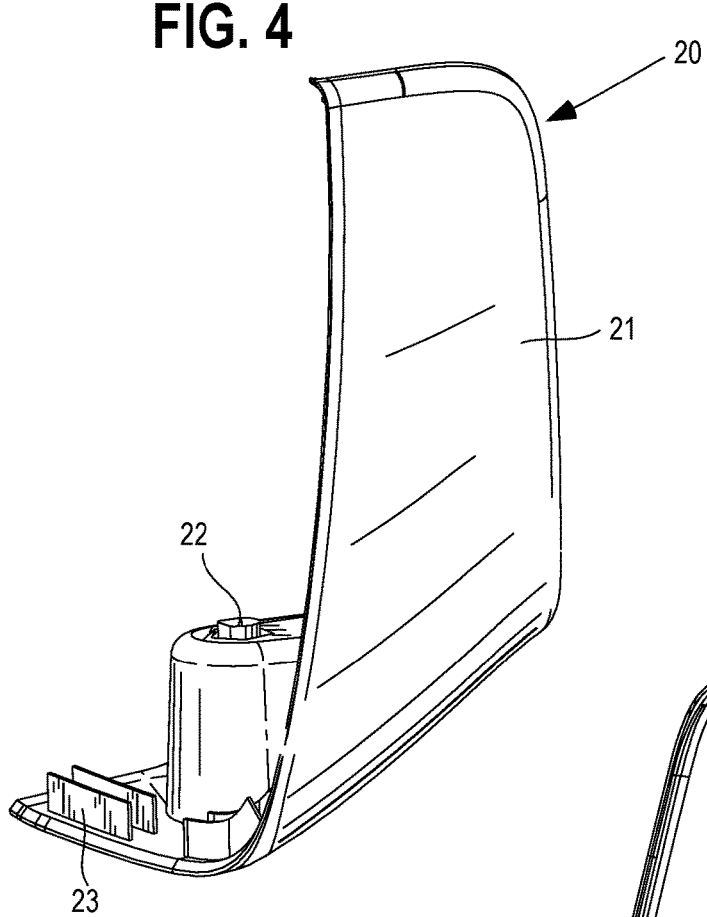
FIG. 4 is an outer perspective view showing a first molded piece of the embodiment of the present invention of FIG. 2 (in this embodiment, the piece configured to be installed outside an automobile wheel well) in the disassembled state.
Figure 5:
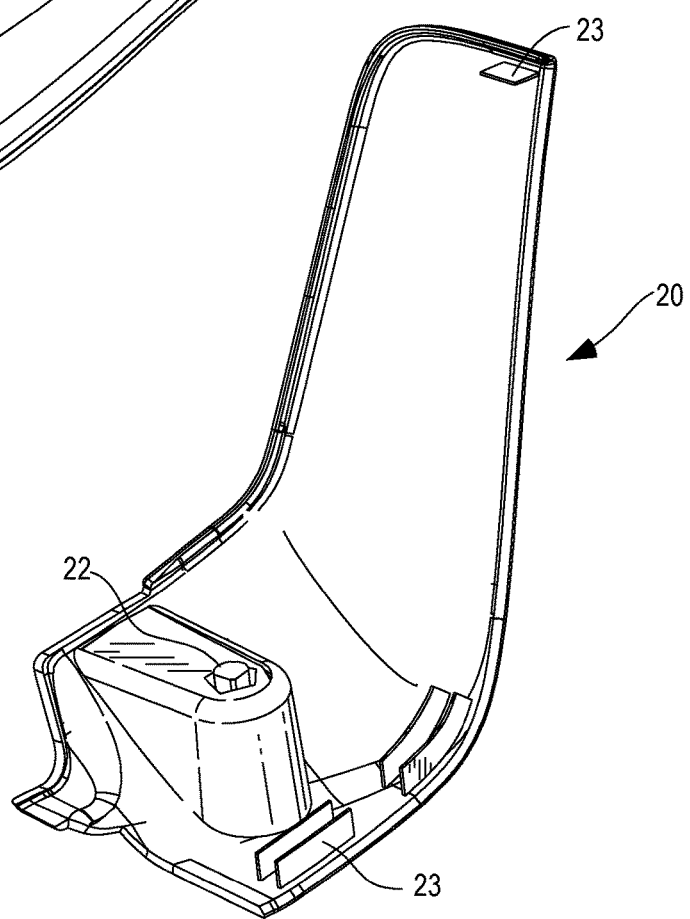
FIG. 5 is an inner perspective view showing a first molded piece of the embodiment of the present invention of FIG. 4 (in this embodiment, the piece configured to be installed outside an automobile wheel well) in the disassembled state from a different perspective.

FIG. 4 is an outer perspective view showing the first molded piece 20 according to one embodiment of the present invention, in the disassembled state. In this embodiment, the piece 20 is configured to be installed outside an automobile wheel well. FIG. 5 is an inner perspective view showing the first molded piece 20 in the disassembled state from a different perspective than that shown in FIG. 4. The piece 20 is preferably made from a paintable grade polymer material, for example, polypropylene. The piece 20 has an area 22 used for attachment to the vehicle body, after assembly, in a known manner. In this embodiment, the piece 20 includes one or more studs or bosses 23 that may be used for attachment to the second piece 30 as will be explained hereinafter. At least the visible exterior surfaces 21 of the first piece molded piece 20 of the splash guard 10 is painted in the color of the exterior of the vehicle body. It is possible to paint all of the first piece molded piece 20 or only the visible exterior surfaces 21.

Figure 6:
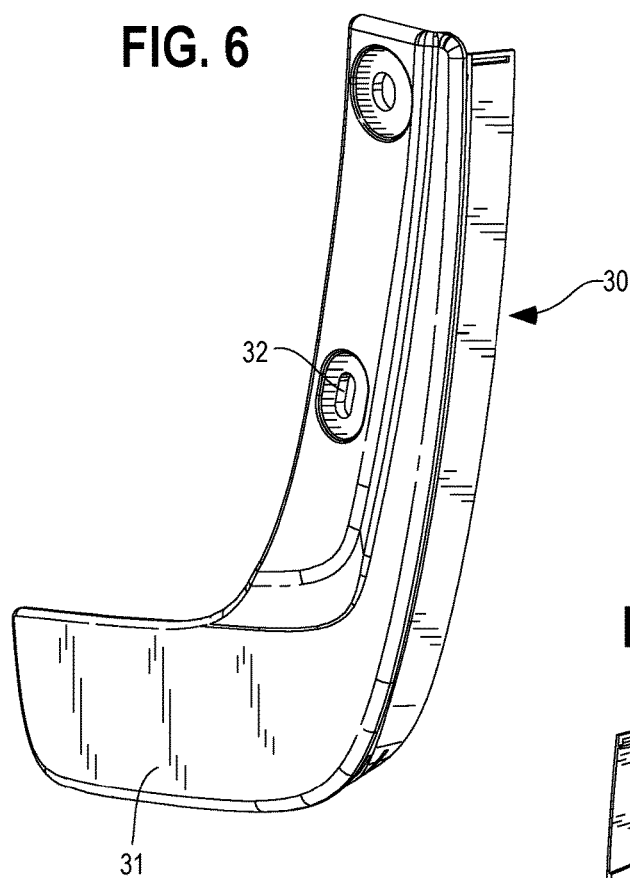
FIG. 6 is an outer perspective view showing a second molded piece of the embodiment of the present invention of FIG. 2 (in this embodiment, the piece configured to be installed in an automobile wheel well) in the disassembled state.
Figure 7:
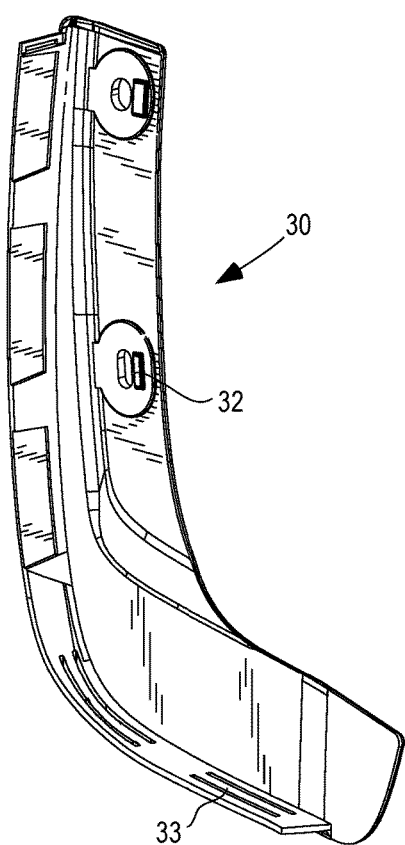
FIG. 7 is an inner perspective view showing a second molded piece of the embodiment of the present invention of FIG. 6 (in this embodiment, the piece configured to be installed in an automobile wheel well) in the disassembled state from a different perspective.

FIG. 6 is an outer perspective view showing the second molded piece 30 according to one embodiment of the present invention in the disassembled state. In this embodiment, the piece second molded piece 30 is configured to be installed in an automobile wheel well. FIG. 7 is an inner perspective view showing the second molded piece 30 in the disassembled state from a different perspective than that of FIG. 6. The second molded piece 30 includes areas 32 for attachment to the vehicle body inside the wheel well. In this embodiment, the second molded piece 30 includes one or more slits or holes 33 mating with the one or more studs or bosses 23 of the first piece 20 to facilitate assembly of the first and second pieces 20, 30 to one another. The second molded piece 30 is, after assembly, installed in the wheel well and preferably has a natural black material such that the visible surface 31 (visible in the wheel well) is colored to avoid contrast with the surrounding black components of the wheel well. Preferably, second molded piece 30 is not painted, in which case it can be molded from a material of a desired color, e.g. black. Of course, it is also possible to paint the second molded piece 30 a different color than the first molded piece 20 or to mold it from a material of any desired color.

Figure 8:
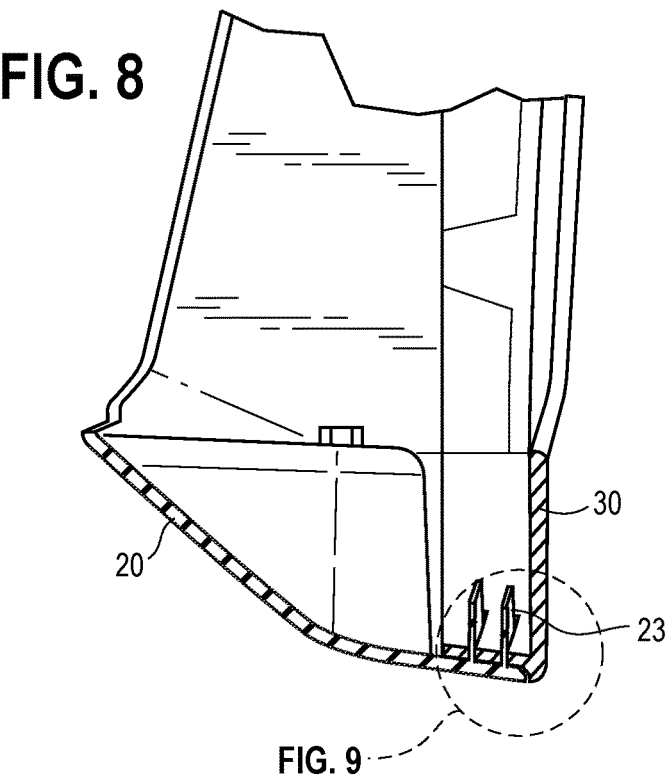
FIG. 8 is a partial sectional view of the assembled first and second pieces according to one embodiment of the invention illustrating an example of a mechanism for joining the first and second pieces.
Figure 9:
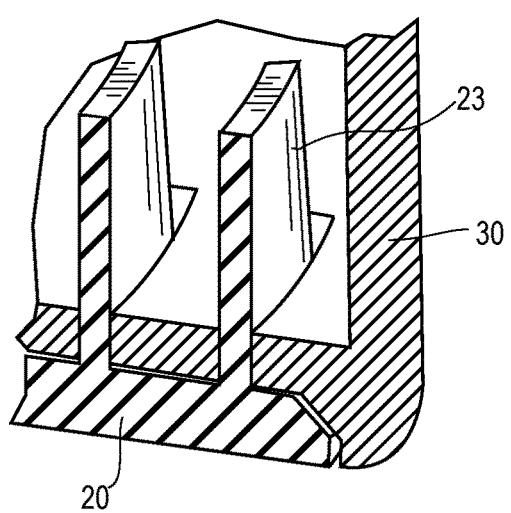
FIG. 9 is an enlarged view of the portion of FIG. 8 outlined with the dashed circle.

FIG. 8 is a partial sectional view of the assembled first piece 20 and second piece 30 according to one embodiment of the invention illustrating an example of a mechanism for joining the first and second pieces. FIG. 9 is an enlarged view of the portion of FIG. 8 outlined with the dashed circle. In this embodiment, the one or more studs or bosses 23 of the first piece 20 are inserted through the corresponding one or more slits or holes 33 of the second piece 30. Then thermoplastic staking or heat staking, e.g., ultrasonic heat staking is used heat to deform the bosses 33, which are deformed through the softening of the plastic to form a head which mechanically locks the two pieces 20, 30 together. Alternatively, or in other areas, e.g., areas 40 shown in FIG. 2, ultrasonic welding can be used to attach pieces 20 and 30.

Alternatives joining methods, such as vibration welding, ultrasonic welding, infra-red welding, taping, gluing and use of snap fit parts may alternatively or additionally be employed.

Figure 10:
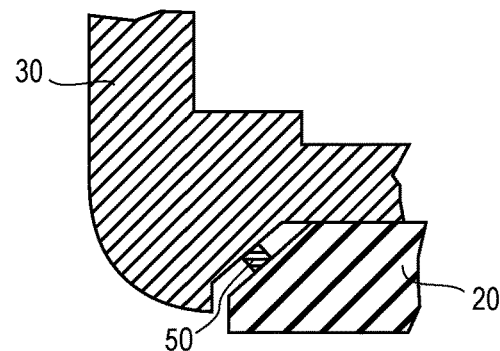
FIG. 10 is a schematic view showing a feature of an embodiment of the invention.

The positioning of the first and second pieces 20, 30 is preferably done so as not to produce an irregular gap or flush mismatch. This positioning can be controlled, e.g., by the use of one or more stand-off ribs 50 or other molded in features designed into the injection molded parts as shown, for example in FIG. 10. The fixture for the final joining process can also be used to help position first and second pieces 20, 30 correctly within the accepted tolerances prior to the mechanical joining.

Figure 11:
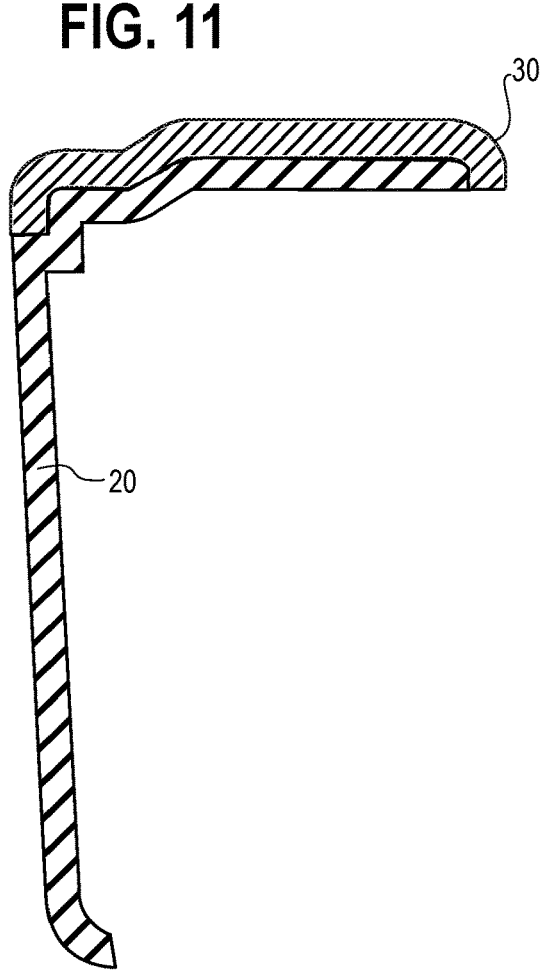
FIG. 11 is a cross-sectional view showing another embodiment of the invention.

FIG. 11 is a cross-sectional view showing schematically another embodiment of the invention in which shown one of the two pieces 20, 30, e.g., the second piece 30 (the unpainted component for the wheel well), snaps on the other component, e.g., the first piece 20 (the painted outer component), or vice-versa. The components could be snapped together in any manner known in the art, e.g., with suitable snap-fit joints.

According to an embodiment of the method of the present invention, the method (e.g., for manufacturing a splash guard) includes molding a first piece (e.g., having a shape configured to have at least a portion thereof installed outside an automobile wheel well); molding a second piece (e.g., having a shape configured to be installed in an automobile wheel well) configured to be attached to the first piece; painting the first piece while it is separate from the second piece; and then attaching the second piece to the first piece.

This method reduces the need for a separate paint masking process. The clean transition line between the painted and non-painted component, e.g., black portion, can be achieved through the implementation of the two piece design.

By producing the painted component as a separate entity, advantages can be found in the areas of labor costs, wasted material, reduced purchased material, increased paint line output through higher skid density and reduced scrap. The customer will continue to see the desired defined parting line between the painted and non-painted part.

While the present invention has been described with respect to embodiments in which the first and second pieces form a splash guard, the present invention can be used to form other components, e.g., other automotive components requiring two different colors, e.g., a painted surface and an unpainted surface.

What is claimed is:

1. A method for manufacturing a splash guard to be installed by an automotive manufacturer on a vehicle body of predetermined design comprising:
    molding a first piece having a shape that has at least a portion to be installed outside an automobile wheel well of the vehicle body of predetermined design;
    molding a second piece having a shape to be installed in an automobile wheel well of the vehicle body of predetermined design, the second piece being attachable to the first piece such that all of a visible surface of the second piece except any visible edge of the second piece abutting the first piece after attachment to the first piece and after installation in the automobile wheel well of the vehicle body of predetermined design is a surface visible from within the wheel well and is opposed to a tire of the automobile;
    painting the first piece while it is separate from the second piece; and then
    attaching the second piece to the first piece prior to installation of the splash guard on the vehicle body of predetermined design.

2. The method for manufacturing a splash guard according to claim 1, wherein the second piece is molded separately from the first piece.

3. The method for manufacturing a splash guard according to claim 1, wherein the first piece is painted a color matching a color of the automobile.

4. The method for manufacturing a splash guard according to claim 3, wherein the second piece is not painted.

5. The method for manufacturing a splash guard according to claim 1, wherein a material of which the second piece is made is black.

6. The method for manufacturing a splash guard according to claim 1, wherein the second piece is attached to the first piece by welding.

7. The method for manufacturing a splash guard according to claim 1, wherein the second piece is attached to the first piece by snap-fit joints.

8. The method for manufacturing a splash guard according to claim 1, wherein positioning of the first and second pieces is controlled by providing one or more stand-off ribs on at least one of the first and second pieces.

9. A splash guard manufactured by the method for manufacturing a splash guard according to claim 1.

* * * * *